(12) United States Patent
Xiang (10) Patent No.: US 10,897,660 B1
(45) Date of Patent: Jan. 19, 2021

(54) INTELLIGENT APPARATUS (71) Applicant: BEIJING XIAOMI MOBILE SOFTWARE CO., LTD., Beijing (CN)

(72) Inventor: Ji Xiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,422

(22) Filed: Nov. 29, 2019

(30) Foreign Application Priority Data

Aug. 28, 2019 (CN) .......................... 2019 1 0800651

(51) Int. Cl.
*H04R 1/02* (2006.01)
*H04R 1/34* (2006.01)

(52) U.S. Cl.
CPC ............. *H04R 1/023* (2013.01); *H04R 1/025* (2013.01); *H04R 1/345* (2013.01)

(58) Field of Classification Search
None
See application file for complete search history.

(56) References Cited

U.S. PATENT DOCUMENTS

| | | | |
|---|---|---|---|
| 2009/0245565 A1* | 10/2009 | Mittleman ............. | H04R 1/025 381/365 |
| 2010/0208930 A1* | 8/2010 | Kopnov .................. | H04M 1/19 381/359 |
| 2012/0237073 A1* | 9/2012 | Goida ..................... | H04R 1/02 381/361 |
| 2020/0137501 A1* | 4/2020 | Piechocinski ........ | H04R 19/005 |
| 2020/0169818 A1* | 5/2020 | Rombach .............. | B81B 7/0061 |

FOREIGN PATENT DOCUMENTS

| CN | 108667990 A | 10/2018 |
|---|---|---|
| CN | 108965538 A | 12/2018 |

OTHER PUBLICATIONS

Certified Copy of Priority Document DE 10 2017 115 405.1, Jul. 10, 2017. (Year: 2017).*
Extended European Search Report dated Jul. 8, 2020 in corresponding European Patent Application No. 20151236.5, 10 pages.

* cited by examiner

*Primary Examiner* — Paul W Huber
(74) *Attorney, Agent, or Firm* — Oblon, McClelland, Maier & Neustadt, L.L.P.

(57) ABSTRACT

The present disclosure provides an intelligent apparatus that can include a housing, an audio module, an outer dust-proof member, and an inner dust-proof member. The housing defines a mounting chamber therein and is provided with a sound guide hole in communication with the mounting chamber. The audio module is arranged in the mounting chamber and includes a sound guide channel in communication with the sound guide hole. The outer dust-proof member is arranged between the sound guide hole and the sound guide channel, and is provided with an outer filter hole communicating the sound guide hole with the sound guide channel. The inner dust-proof member is arranged between the outer dust-proof member and the sound guide channel, and is provided with an inner filter hole communicating the outer filter hole with the sound guide channel. The outer filter hole has a larger aperture size than the inner filter hole.

16 Claims, 6 Drawing Sheets

INTELLIGENT APPARATUS

CROSS-REFERENCE TO RELATED APPLICATION

The present disclosure is based on and claims priority to Chinese Patent Application No. 201910800651.1, filed on Aug. 28, 2019, the entire content of which is incorporated herein by reference.

TECHNICAL FIELD

The present disclosure relates to a field of intelligent apparatuses, and more particularly, to an intelligent apparatus.

BACKGROUND

An intelligent apparatus includes an audio module for playing or picking up sound. Generally, a housing of the intelligent apparatus is provided with a sound guide hole, which is communicated with the audio module. One end of the sound guide hole is provided with a dust-proof net to block solid dirt, such as dust and iron scraps as well as liquid dirt such as water, beverage and oil in the environment from jamming the audio module. However, with a long-term use of the intelligent apparatus, the dirt can attached to the dust-proof net until the dust-proof net becomes blocked. As a result, a volume of the intelligent apparatus can be reduced and an internal pressure of the audio module can increase, thus affecting a heat dissipation performance of the audio module, shortening a service life thereof, and increasing after-sales problems.

SUMMARY

The present disclosure provides an improved intelligent apparatus. An aspect of the present disclosure provides an intelligent apparatus which can include a housing defining a mounting chamber therein and that is provided with a sound guide hole in communication with the mounting chamber. The intelligent apparatus can further include an audio module arranged in the mounting chamber and a sound guide channel in communication with the sound guide hole. Further, the apparatus can include an outer dust-proof member arranged between the sound guide hole and the sound guide channel, and provided with an outer filter hole communicating the sound guide hole with the sound guide channel, and an inner dust-proof member arranged between the outer dust-proof member and the sound guide channel, and provided with an inner filter hole communicating the outer filter hole with the sound guide channel. The outer filter hole can have an aperture size larger than an aperture size of the inner filter hole.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Exemplary embodiments of the present disclosure will be described in details herein, and the examples thereof are illustrated in the accompanying drawings. When the description below concerns the drawings, same numbers in different drawings represent same or similar elements unless indicated otherwise. In the following exemplary embodiments, the embodiments illustrated do not represent all embodiments consistent with the present disclosure. Instead, they are merely examples of devices and methods consistent with some aspects of the present disclosure as detailed in the appended claims.

The terms used in the present disclosure are merely for the purpose of describing specific embodiments, which are not intended to limit the present disclosure. Unless defined otherwise, the technical or scientific terminologies used in the present disclosure shall be the general meaning understood by those skilled in the related art of the present disclosure. Terms such as "first", "second" and the like used in the descriptions and claims of the present disclosure do not indicate any order, quantity or importance, but are only used to distinguish different components. Similarly, terms such as "one" or "a" do not refer to quantity limitation, but to indicate the existence of at least one. Unless specified otherwise, terms such as "comprise" or "comprising" and the like mean that the elements or objects presented before "comprise" or "comprising" contain the elements or objects presented after "comprise" or "comprising" and their equivalents, which do not exclude other elements or objects. The terms "mounted," "connected," and the like are not restricted to physical or mechanical connections, can also be electrical connections, no matter direct or indirect.

As used in the descriptions and the appended claims of the present disclosure, "a" and "the" in singular forms mean including plural forms, unless clearly indicated in the context otherwise. It should also be understood that, as used herein, the term "and/or" represents and contains any and all possible combinations of one or more associated listed items.

Figure 1:
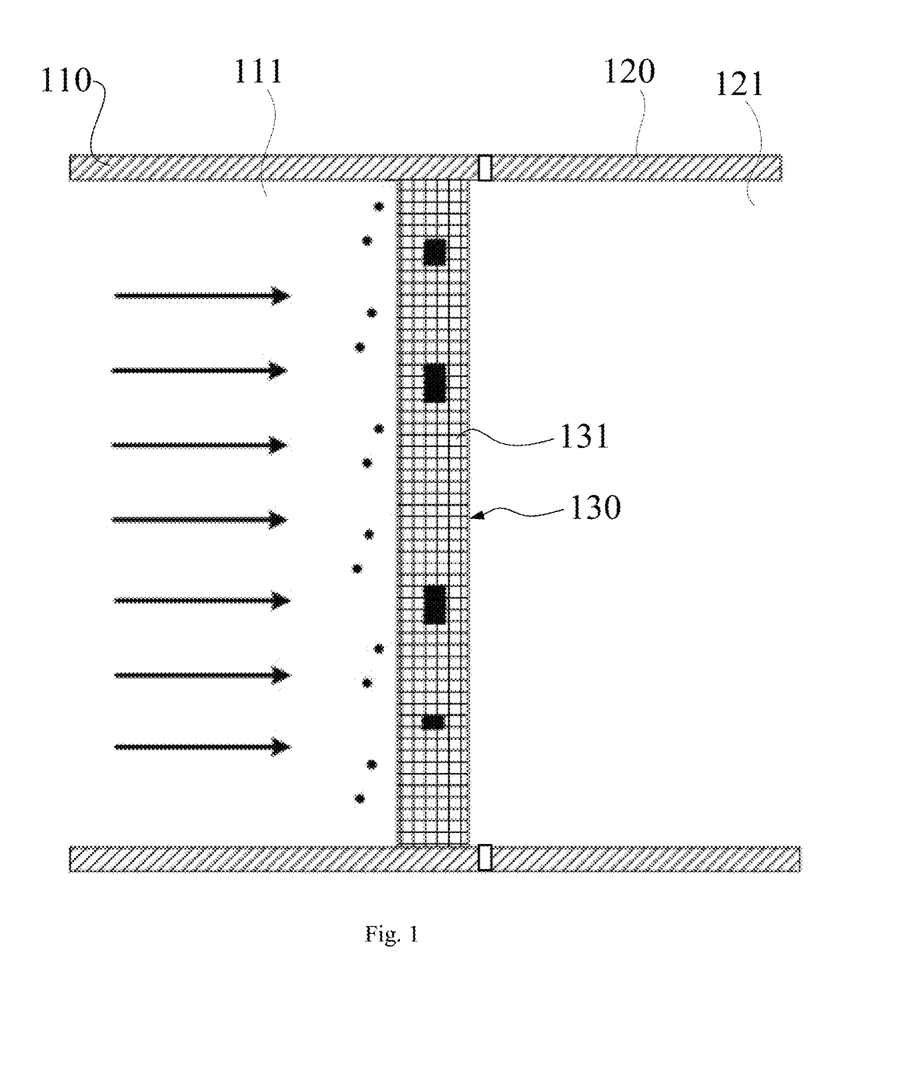
FIG. 1 is a partially schematic view of an intelligent apparatus in the related art.

FIG. 1 shows a partially schematic view of an intelligent apparatus in the related art. As illustrated in FIG. 1, the intelligent apparatus includes a housing 110 and an audio module 120. The housing 110 is provided with a mounting chamber and a sound guide hole 111 in communication with the mounting chamber. The audio module 120 is arranged in the mounting chamber. The audio module 120 includes a sound guide channel 121 in communication with the sound guide hole 111, and a dust-proof member 130 is arranged between the sound guide hole 111 and the sound guide channel 121. The dust-proof member 130 is provided with a dust-proof hole 131 with an aperture of about 19 µm. The dust-proof member 130 is also provided with a water-proof coating which can play a certain role in dust-proof and water-proof. The dust-proof member 130 is a filter sieve.

As service time passes, solid particles such as dust and iron scraps will attach to the dust-proof member 130, and water, oil, beverage and other liquids in the air will also attach to the dust-proof member 130. The combination of these solid dirt and liquid dirt will jam the dust-proof hole 131, thus increasing the impedance of sound transmission (referred to as "acoustic impedance"). As a result, the sound transmitted from the audio module 120 can be reduced, even to silence. Further, an internal pressure of the audio module 120 will also be increased, and thus the heat dissipation performance of the audio module 120 can be weakened, thereby tending to damage the audio module 120 and increase the after-sales problems of the intelligent apparatus. For example, in locations where the environment is bad, the dust-proof member 130 of the intelligent apparatus is more likely to be jammed, which seriously affects the sale and the after-sale service of the intelligent apparatus.

In view of the above problems, an intelligent apparatus is provided in exemplary embodiments of the present disclosure. The intelligent apparatus can include a housing, an audio module, an outer dust-proof member, and an inner dust-proof member. The housing can be provided with a mounting chamber and also a sound guide hole in communication with the mounting chamber. The audio module is arranged in the mounting chamber and includes a sound guide channel in communication with the sound guide hole. The outer dust-proof member is arranged between the sound guide hole and the sound guide channel, and is provided with an outer filter hole that communicates the sound guide hole with the sound guide channel. The inner dust-proof member is arranged between the outer dust-proof member and the sound guide channel, and is provided with an inner filter hole that communicates the outer filter hole with the sound guide channel. An aperture size of the outer filter hole is larger than an aperture size of the inner filter hole.

In the intelligent apparatus provided in embodiments of the present disclosure, the outer dust-proof member and the inner dust-proof member are provided between the sound guide hole of the housing and the sound guide channel of the audio mobile. Further, the aperture size of the outer filter hole in the outer dust-proof member is larger than the aperture size of the inner filter hole in the inner dust-proof member. Accordingly, the outer dust-proof member can block a large-particle dirt, while the inner dust-proof member can block a small-particle dirt. Moreover, the small-particle dirt blocked by the inner dust-proof member may be discharged from the outer dust-proof hole by means of an external force, thus reducing the accumulation of the dirt on the inner dust-proof member and the outer dust-proof member.

Use of the combination of the outer dust-proof member and the inner dust-proof member can delayed or prevented dirt from jamming the outer filter hole and the inner filter hole effectively. This can avoid the acoustic impedance from being increased and causing the volume of the intelligent apparatus from degrading. This can further avoid the internal pressure of the audio module from being increased so as to ensure the heat dissipation performance of the audio module. Accordingly, the service life of the audio module can be extended and the after-sales problems of the intelligent apparatus can be reduced.

The intelligent apparatus provided in the embodiments of the present disclosure includes, but is not limited to, a mobile phone, a tablet computer, an iPad, a digital broadcasting terminal, a message receiving and sending device, a game console, a medical facility, a fitness facility, a personal digital assistant, an intelligent wearable apparatus and other intelligent home products, and the like.

Figure 2:
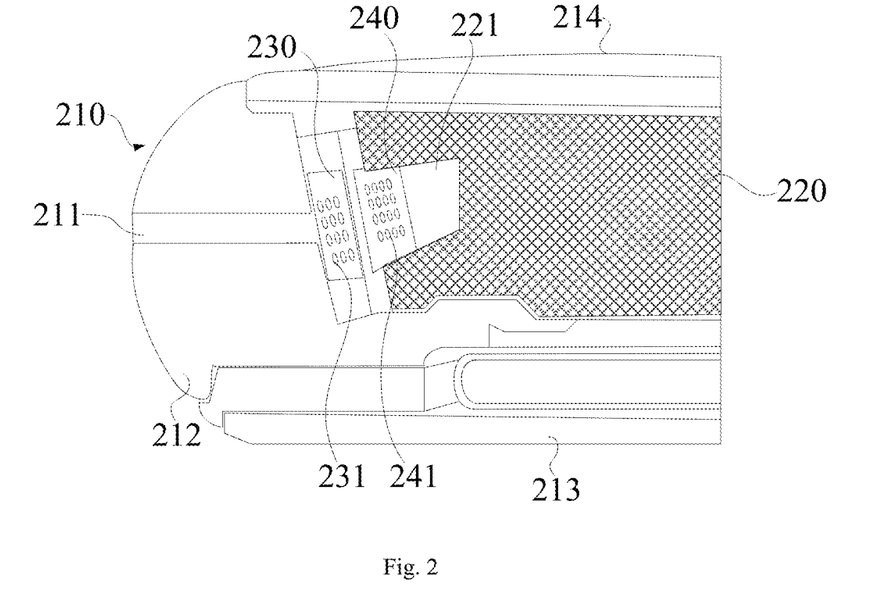
FIG. 2 is a partially sectional view of an intelligent apparatus according to an exemplary embodiment of the present disclosure.
Figure 3:
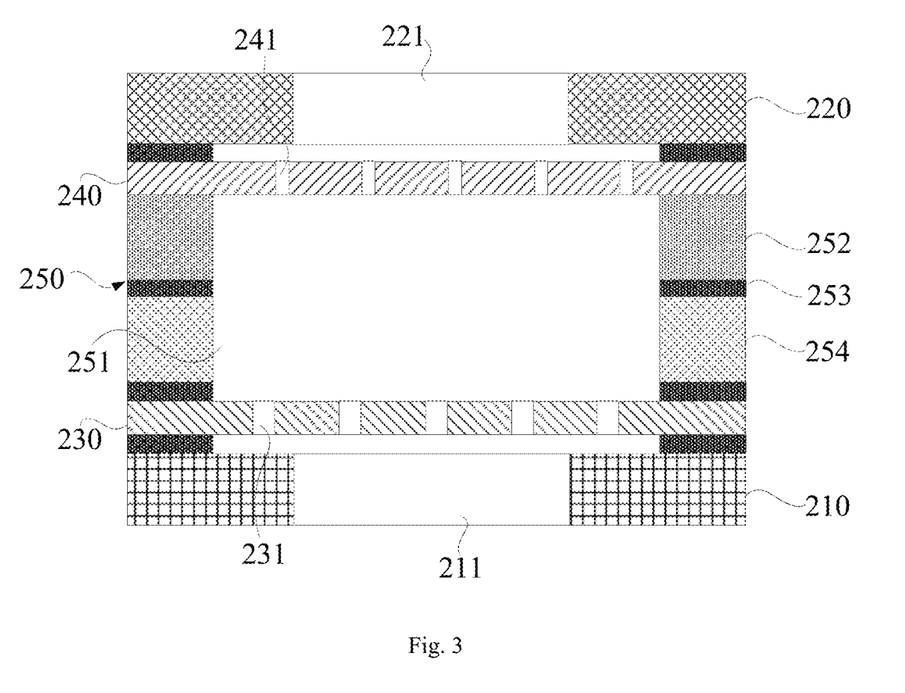
FIG. 3 is a partially schematic view of an intelligent apparatus according to an exemplary embodiment of the present disclosure.

FIG. 2 shows a partially sectional view of an intelligent apparatus according to an exemplary embodiment of the present disclosure. FIG. 3 shows a partially schematic view of an intelligent apparatus according to an exemplary embodiment of the present disclosure. As illustrated in FIG. 2 and FIG. 3, the intelligent apparatus includes a housing 210, an audio module 220, an outer dust-proof member 230 and an inner dust-proof member 240.

In an embodiment, further as illustrated in FIG. 2, the housing 210 may include a front shell 212 and a rear cover 213. A front side of the front shell 212 may be provided with a display screen 214, and a rear side of the front shell 212 may be provided with a middle frame along a circumferential direction. The rear cover 213 may be covered on the rear side of the front shell 212, and a mounting chamber of the housing 210 is formed among the front shell 212, the middle frame and the rear cover 213. The audio module 220, the outer dust-proof member 230, the inner dust-proof member 240, and other modules may be arranged in the mounting chamber. The housing 210 is provided with a sound guide hole 211 in communication with the mounting chamber. For example, a side wall of the middle frame or the front shell 212 may be provided with the sound guide hole 211 in communication with the mounting chamber.

In an embodiment, the sound guide hole 211 may have a regular structure such as a cylindrical hole, a frustoconical hole, a square hole, or have an irregular structure such as a curved shape, which is not specifically limited in embodiments of the present disclosure.

The audio module 220 is arranged in the mounting chamber of the housing 210, and includes a sound guide channel 221 in communication with the sound guide hole 211. The audio module 220 includes a loudspeaker module, a receiver module and a microphone module. The loudspeaker module and the receiver module are electroacoustic transducers which are able to transform an electronic signal into a sound signal. The microphone module is an electroacoustic transducer which is able to transform the sound signal into the electric signal. The loudspeaker module, the receiver module and the microphone module all may be arranged in the mounting chamber of the housing 210 in a detachable manner so as to be mounted and dismounted conveniently. In some embodiments, the loudspeaker module is fixed in the mounting chamber by a fixing member, such as a screw. In some embodiments, the loudspeaker module is arranged in the mounting chamber by means of snapping. In some embodiments, the loudspeaker module is bonded in the mounting chamber. This is not specifically limited in embodiments of the present disclosure. The mounting modes of the receiver module and the microphone module may refer to that of the loudspeaker module, which will not be described herein any more.

Taking the loudspeaker module as an example, the loudspeaker module may include a sound guide channel 221 in communication with the sound guide hole 211 so as to provide a sound guide channel for sound and ensure the sound quality. In an embodiment, the sound guide channel 221 may have regular structure such as a cylindrical hole, a frustoconical hole, a polygonal cylinder hole, or have an irregular structure such as a curved shape, which is not specifically limited in embodiments of the present disclosure.

Continuing to refer to FIG. 2 and FIG. 3, the outer dust-proof member 230 is arranged between the sound guide hole 211 and the sound guide channel 221, and the outer dust-proof member 230 is provided with an outer filter hole 231 that communicates the sound guide hole 211 with the sound guide channel 221. The outer dust-proof member 230 may be a filter sieve, and the outer filter hole 231 may have various structures. In an embodiment, the outer filter hole 231 may have a regular structure, such as a square hole, a circular hole, a polygonal hole, a triangular hole, and the like, or have an irregular structure, as long as the dirt can be blocked. In an embodiment, a plurality of outer filter holes 231 are evenly arranged in the outer dust-proof member 230, such that each region of the outer dust-proof member 230 can effectively block the dirt. In an embodiment, an aperture size of the outer filter hole 231 may have a range of 40-300 μm, and for example, may be 40 μm, 60 μm, 85 μm, 100 μm, 120 μm, 150 μm, 180 μm, 200 μm, 220 μm, 250 μm, 280 μm, 300 μm, and the like. In some embodiments, the aperture size of the outer filter hole 231 is configured in such a manner that the dirt of a large particle size can be blocked effectively.

Figure 4:
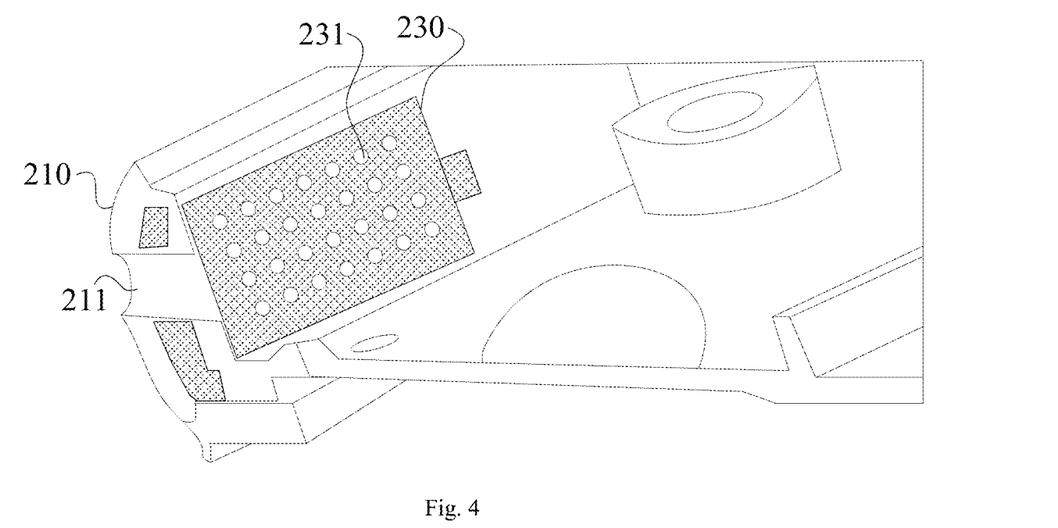
FIG. 4 is a partially schematic view of connection between a housing and an outer dust-proof member according to an exemplary embodiment of the present disclosure.

FIG. 4 is a partially sectional view illustrating a connection between a housing 210 and an outer dust-proof member 230 according to an exemplary embodiment of the present disclosure. In an embodiment, as illustrated in FIG. 3 and FIG. 4, the outer dust-proof member 230 is detachably connected with an inner wall of the housing 210 at a periphery of the sound guide hole 211, so as to dismount and replace the outer dust-proof member 230 conveniently, when the outer dust-proof member 230 is jammed. The outer dust-proof member 230 may be fixed to the inner wall of the housing 210 in a variety of ways. In some embodiments, the outer dust-proof member 230 may be detachably fixed to the housing 210 by means of a fixing member, and the fixing member may be a screw. In some embodiments, the outer dust-proof member 230 is snapped to the inner wall of the housing 210. In addition, the outer dust-proof member 230 may also be bonded to the inner wall of the housing 210 at the periphery of the sound guide hole 211 by means of a backing adhesive. The bonding connection between the outer dust-proof member 230 and the housing 210 is simple, and the outer dust-proof member 230 may be separated from the housing 210 by tearing the outer dust-proof member 230 off.

Continuing to refer to FIG. 2 and FIG. 3, the inner dust-proof member 240 is arranged between the outer dust-proof member 230 and the sound guide channel 221. The inner dust-proof member 240 can be provided with an inner filter hole 241 that communicates the outer filter hole 231 with the sound guide channel 221. The aperture size of the outer filter hole 231 is larger than that of the inner filter hole 241. It should be noted that, the aperture size of the outer filter hole 231 refers to the maximum or average aperture size of the outer filter hole 231. The aperture size of the inner filter hole 241 refers to the maximum or average aperture size of the inner filter hole 241.

Figure 5:
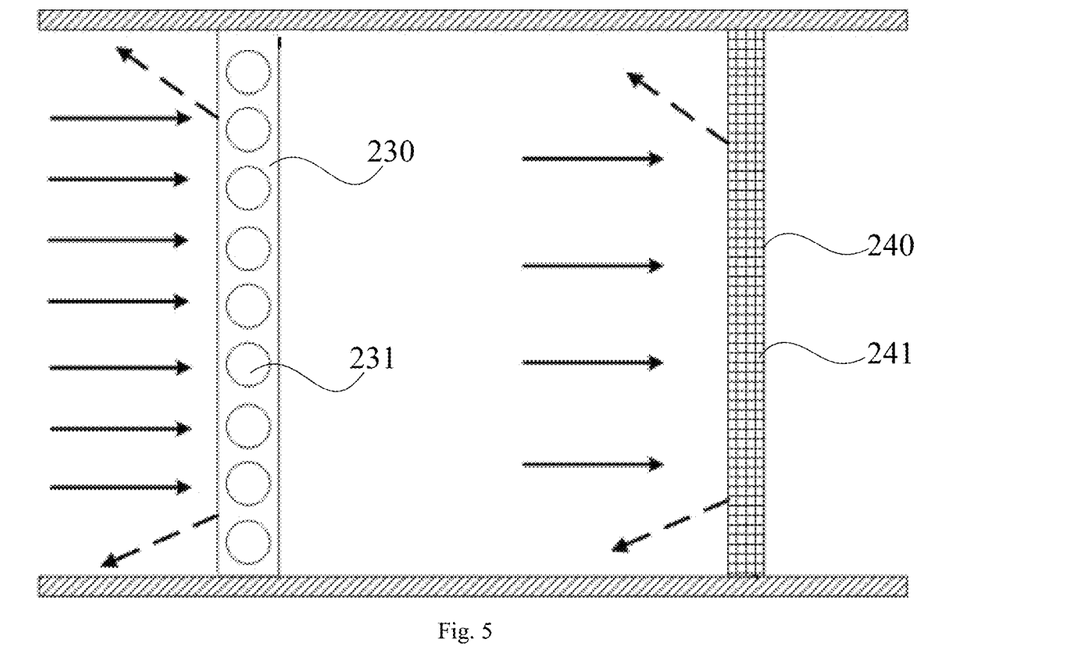
FIG. 5 is a schematic view illustrating a dust-proof effect of a combination of an outer dust-proof member and an inner dust-proof member according to an exemplary embodiment of the present disclosure.

FIG. 5 is a schematic view illustrating a dust-proof effect of a combination of the outer dust-proof member 230 and the inner dust-proof member 240 according to an exemplary embodiment of the present disclosure. In FIG. 5, the arrow indicates the moving direction of the dirt. In some embodiments, as illustrated in FIG. 5, by means of configuring the aperture size of the outer filter hole 231 to be larger than that of the inner filter hole 241, the outer dust-proof member 230 can block the dirt of the large particle size, and the inner dust-proof member 240 can block the dirt of the small particle size from entering the sound guide channel 221 of the audio module 220. In addition, by means of an external force, the dirt of the small particle size blocked by the inner dust-proof member 240 may also be discharged out of the outer filter hole 231 of the outer dust-proof member 230, thus reducing the accumulation of the dirt on the inner dust-proof member 240 and the outer dust-proof member 230.

In other embodiments, by means of the combination of the outer dust-proof member 230 and the inner dust-proof member 240, the dirt can be prevented from jamming the outer filter hole 231 and the inner filter hole 241 effectively, thus avoiding the acoustic impedance from being increased. The volume of the audio module 220 is ensured, the internal pressure of the audio module 220 is avoided from being increased, and the effective heat dissipation of the audio module is also ensured, thereby facilitating extension of the service life of the audio module 220, and reducing the after-sales problems of the intelligent apparatus.

Further as illustrated in FIG. 3, the intelligent apparatus provided in some embodiments of the present disclosure also includes a buffer member 250, and the buffer member 250 has a buffer channel 251. One end of the buffer channel 251 is in communication with the sound guide hole 211 through the outer dust-proof member 230, and the other end of the buffer channel 251 is in communication with the sound guide channel 221 through the inner dust-proof member 240. In some embodiments, the buffer channel 251 provides a buffer space for the small-particle dirt passing through the outer dust-proof member 230, such that the small-particle dirt will not be attached to the inner dust-proof member 240 or pass through the inner dust-proof member 240 quickly, thus delaying and reducing a jammed hole rate of the inner dust-proof member 240. Moreover, by arranging the buffer member 250, the small-particle dirt can also be prevented from being directly attached to the outer dust-proof member 230 to jam the outer dust-proof member 230, after being separated from the inner dust-proof member 240. Under an action of the external force, such as knocking and swinging, it is possible for the small-particle dirt attached to the inner dust-proof member 240 or located in the buffer channel 251 to be discharged from the outer filter hole 231.

In an embodiment, at least a part of the one end of the buffer channel 251 in communication with the inner dust-proof member 240 is projected on the outer dust-proof member 230. In some embodiments, this arrangement allows the small-particle dirt attached to the inner dust-proof member 240 and the small-particle dirt in the buffer channel 251 to be easily discharged out of the outer filter hole 231 of the outer dust-proof member 230 under the action of the external force, so as to avoid the dirt from accumulating in the buffer channel 251 and to the inner dust-proof member 240. In an embodiment, the one end of the buffer channel 251 in communication with the inner dust-proof member 240 is completely projected on the outer dust-proof member 230. In some embodiments, this arrangement allows the small-particle dirt attached to the inner dust-proof member 240 and the small-particle dirt in the buffer channel 251 to be easily and quickly discharged out of the outer filter hole 231 of the outer dust-proof member 230 under the action of the external force.

When the audio module 220 transmits sound, the outer dust-proof member 230 and the inner dust-proof member 240 will inevitably interfere with each other when they resonate under the action of sound waves. To solve this problem, in an embodiment, a length of the buffer channel 251 along a sound transmission direction has a range of 0.3 mm-2 mm, and for example, may be 0.3 mm, 0.6 mm, 0.9 mm, 1 mm, 1.2 mm, 1.4 mm, 1.6 mm, 1.8 mm, 2 mm, and so on. It should be understood that the length of the buffer channel 251 along the sound transmission direction is a distance between the outer dust-proof member 230 and the inner dust-proof member 240, or a length of an axis of the buffer channel 251. In some embodiments, this arrangement allows the outer dust-proof member 230 and the inner dust-proof member 240 not to interfere with each other when they resonate under the action of the sound waves. In addition, when subjected to the external force such as knocking and swinging, the small-particle dirt can be easily discharged from the outer filter hole 231 of the outer dust-proof member 230.

In an embodiment, continuing to refer to FIG. 3, the buffer member 250 includes a flexible sealing piece 252, one end of the flexible sealing piece 252 is communicated with the outer dust-proof member 230 and the other end of the flexible sealing piece 252 is communicated with the inner dust-proof member 240. In some embodiments, the flexible sealing piece 252 provides the buffer member 250 with deformation and sealing properties, which facilitates the effective transmission of sound in the buffer channel 251, so as to ensure the sound quality. In an embodiment, the flexible sealing piece 252 is foam. In some embodiments, by using the foam, the buffer member 250 has advantages of elasticity, light weight, convenient use, free bending, ultra-thin volume, good sealing property, and so on, so as to easily form the sealed buffer channel 251 without being affected by the structures of the mounting chamber of the housing 210 and the audio module 220. Continuing to refer to FIG. 3, one end of the foam is bonded to the inner dust-proof member 240, the other end of the foam is bonded to a backing adhesive 253, and the backing adhesive 253 is bonded to the outer dust-proof member 230 by a flexible adhesive 254 and another backing adhesive. Middle portions of the foam, the backing adhesive 253 and the flexible adhesive 253 are communicated with one another to form the buffer channel 251. In some embodiments, the foam, the backing adhesive 253 and the flexible adhesive 254 are easy to obtain, and allow the buffer member 250 to be suitable for the mounting chambers of different structures, and also to form the buffer channel 251 with the good sealing property and the stable structure.

Figure 6:
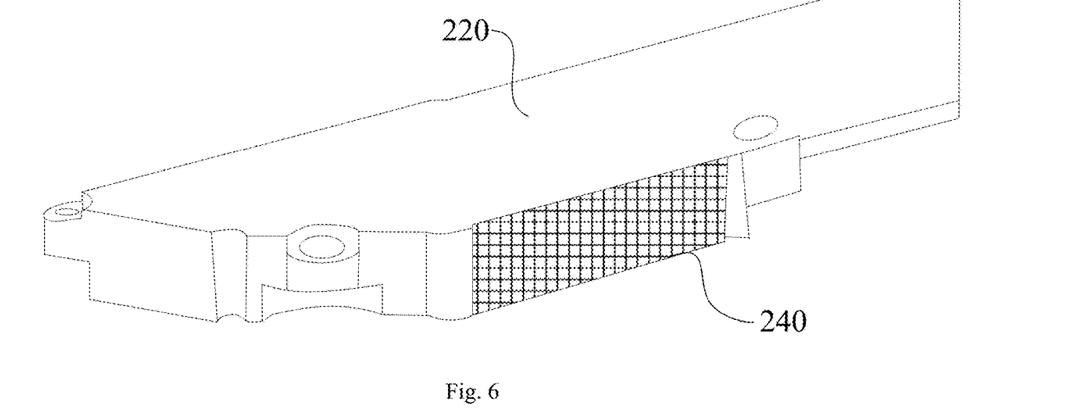
FIG. 6 is a partially schematic view of an audio module connected with an inner dust-proof member according to an exemplary embodiment of the present disclosure.

FIG. 6 is a partially schematic view of an audio module 220 connected with an inner dust-proof member 240 according to an exemplary embodiment of the present disclosure. In an embodiment, as illustrated in FIG. 2 and FIG. 6, the inner dust-proof member 240 is detachably connected with a part of the audio module 220 arranged at the periphery of the sound guide channel 221, such that the inner dust-proof member 240 is easily dismounted and replaced when the inner dust-proof member 240 is jammed. The inner dust-proof member 240 may be fixed to the audio module 220 in various manners. In some embodiments, the inner dust-proof member 240 may be detachably fixed to the audio module 220 by means of the fixing member, and the fixing member may be a screw. In some embodiments, the inner dust-proof member 240 is snapped to the audio module 220. In addition, the inner dust-proof member 240 may also be bonded to the part of the audio module 220 arranged at the periphery of the sound guide channel 221 by means of a backing adhesive, and thus the inner dust-proof member 240 can be separated from the audio module 220 by tearing the inner dust-proof member 240 off.

Figure 7:
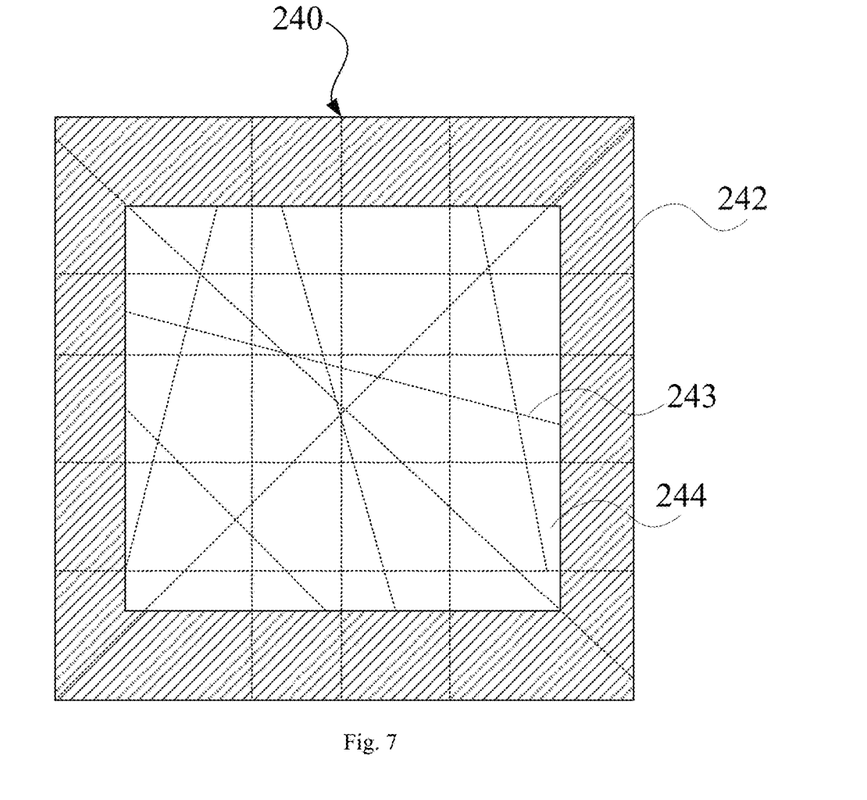
FIG. 7 is a partially schematic view of an inner dust-proof member according to an exemplary embodiment of the present disclosure.
Figure 8:
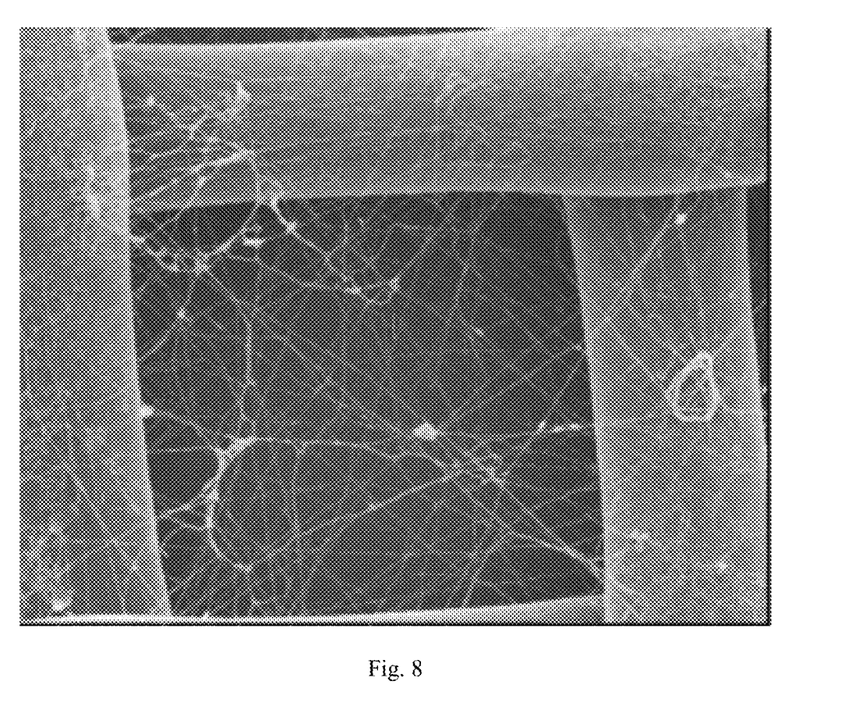
FIG. 8 is a scanning electron micrograph of an inner dust-proof member according to an exemplary embodiment of the present disclosure.

FIG. 7 is a partially schematic view of the inner dust-proof member 240 according to an exemplary embodiment of the present disclosure. FIG. 8 is a scanning electron micrograph of the inner dust-proof member 240 according to an exemplary embodiment of the present disclosure. In an embodiment, as illustrated in FIG. 7 and FIG. 8, the inner dust-proof member 240 includes a dust-proof body 242 and a plurality of dust-proof threads 243, and the dust-proof body 242 is provided with a plurality of through holes 244. FIG. 7 shows one through hole 244 of the dust-proof body 242. The plurality of dust-proof threads 243 are covered on the through hole 244 in an interwoven manner to form the inner filter hole 241. In some embodiments, the structure of the inner dust-proof member 240 configured in this manner may not only effectively filter the small-particle dirt out, but also have a small acoustic impedance, so as not to attenuate the sound and affect the volume of the audio module 220. Materials of the inner dust-proof member 240 include fiber materials or metal materials, which has the effective filtering effect without increasing the acoustic impedance.

In an embodiment, the through hole 244 of the dust-proof body 242 has a regular structure, such as a square shape, a circular shape, a triangular shape, and an elliptical shape, or an irregular structure, which is not specifically limited in the present disclosure. In an embodiment, an aperture size of the through hole 244 of the dust-proof body 242 has a range of 50-300 μm, and for example, may be 50 μm, 70 μm, 90 μm, 100 μm, 120 μm, 150 μm, 180 μm, 200 μm, 210 μm, 230 μm, 250 μm, 270 μm, 300 μm, and so on. In some embodiments, the aperture size of the through hole 244 configured in this manner, in combination with the interwoven dust-proof threads 243, facilitates the forming of the inner filter hole 241 that can block the small-particle dirt without increasing the acoustic impedance and affecting the volume of the intelligent apparatus. In an embodiment, the plurality of dust-proof threads 243 may be covered on the dust-proof body 242 by spraying.

In an embodiment, the dust-proof thread 243 may be a nanowire, and a diameter of the dust-proof thread 243 has a range of 30-50 nm, and for example, may be 30 nm, 33 nm, 35 nm, 38 nm, 40 nm, 43 nm, 45 nm, 48 nm, 50 nm and so on. In some embodiments, this arrangement allows the inner dust-proof member 240 to have a small acoustic impedance so as to have no effect on the volume of the intelligent apparatus, and also to prevent the small-particle dirt from entering the sound guide channel 221 of the audio module 220.

In an embodiment, in order to allow the inner dust-proof member 240 to effectively block water, oil, and other dirt, a surface of the dust-proof thread 243 is provided with a water-proof layer and/or an oil-proof layer. In an embodiment, when producing the dust-proof thread 243, the dust-proof thread 243 is generated by cold spinning after being mixed with the water-proof materials and/or the oil-proof materials, such that the surface of the dust-proof thread 243 is at least partially provided with the water-proof layer and/or the oil-proof layer. In another embodiment, after the dust-proof thread 243 is produced, the dust-proof materials and/or the oil-proof materials are coated or sprayed on the surface of the dust-proof thread 243, such that the surface of the dust-proof thread 243 is at least partially provided with the water-proof layer and/or the oil-proof layer. In some embodiments, since the surface of the dust-proof thread 243 is at least partially provided with the water-proof layer and/or the oil-proof layer, the inner dust-proof member 240 has a water-proof function and/or an oil-proof function, such that the solid particles and the dirt such as water and oil are prevented from jamming the inner dust-proof member 240.

In an embodiment, the materials of the water-proof layer include, but is not limited to, chloroprene rubber, butyl rubber, Ethylene-Propylene-Diene Monomer (EPDM) rubber, Poly Vinyl Chloride (PVC), polyisobutene, polyurethane, and so on. In an embodiment, the materials of the oil-proof layer include, but are not limited to, nylon, butyl, polyvinyl alcohol, and so on.

Figure 9:
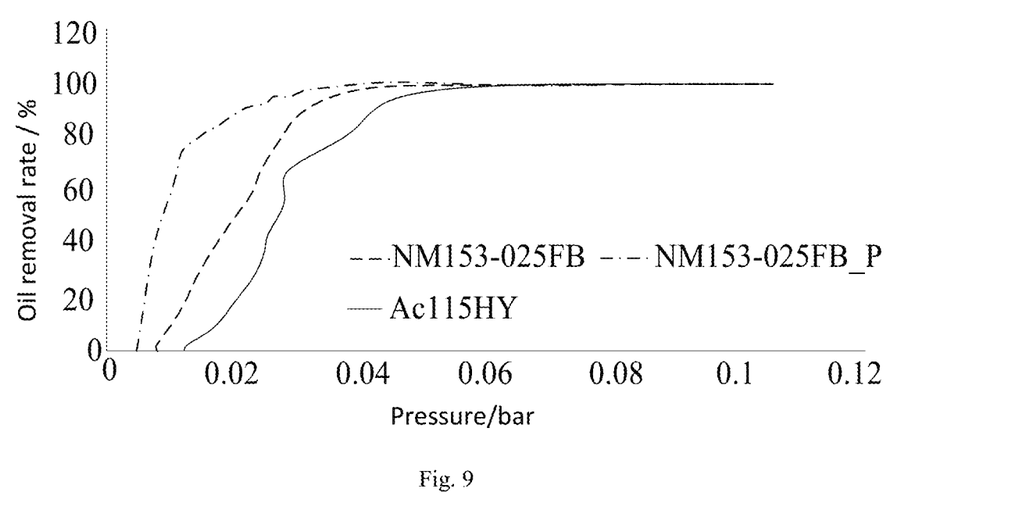
FIG. 9 is a graph illustrating a relationship between an oil removal rate and a pressure of an inner dust-proof member according to an exemplary embodiment of the present disclosure.

FIG. 9 is a graph illustrating a relationship between an oil removal rate and a pressure of the inner dust-proof member 240 according to an exemplary embodiment of the present disclosure. In the present embodiment, the oil is dripped on the inner dust-proof member 240 of different models and on an ordinary filter sieve, and then the oil removal rates of the inner dust-proof member 240 of different models and of the ordinary filter sieve are recorded under different pressures. The higher the oil removal rate is, the better the oil-proof performance is. The inner dust-proof member 240 of model NM153-025FB_P includes the dust-proof body 242 and the plurality of dust-proof threads 243. The dust-proof body 242 is provided with a plurality of through holes 244, and the plurality of dust-proof threads 243 are covered on the through holes 244 in an interwoven manner to form the inner filter holes 241. The surface of the dust-proof thread 243 is provided with the oil-proof layer. The inner dust-proof member 240 of model NM153-025FB is similar to the inner dust-proof member 240 of model NM153-025FB_P. The difference therebetween is that the surface of the dust-proof thread 243 of the inner dust-proof member 240 of model NM153-025FB is provided with the water-proof layer and is not provided with the oil-proof layer. The inner dust-proof member of model Ac115HY is the ordinary filter sieve. As can be seen from FIG. 9, the oil removal rate of the inner dust-proof member 240 of model NM153-025FB_P can reach 80% just under a small pressure, and has the oil-proof effect better than that of the inner dust-proof member 240 of model NM153-025FB, while the oil removal rate of the inner dust-proof member 240 of model Ac115HY can reach 80% only under a large pressure. It can be seen that the inner dust-proof member 240 provided in the embodiment of the present disclosure has a good oil-proof effect.

Figure 10:
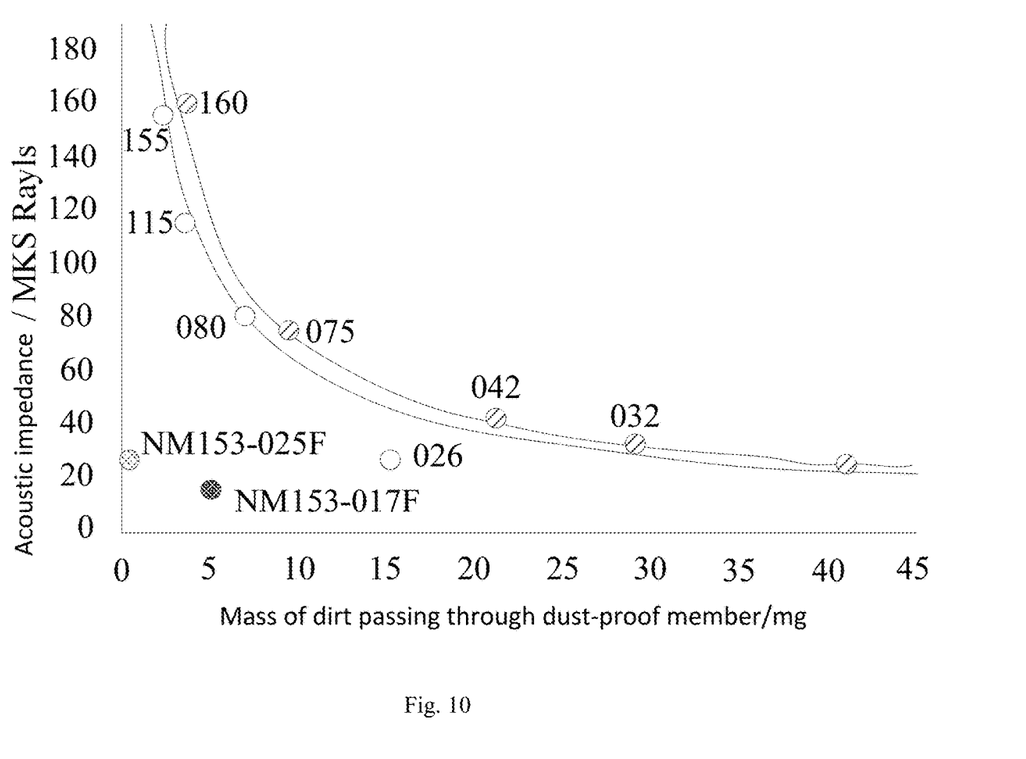
FIG. 10 a graph illustrating a relationship between a mass of dirt passing through a dust-proof member and an acoustic impedance according to an exemplary embodiment of the present disclosure.

FIG. 10 a graph illustrating a relationship between a mass of dirt passing through a dust-proof member and an acoustic impedance according to an exemplary embodiment of the present disclosure. In the present embodiment, the masses of the dirt passing through the inner dust-proof members 240 of different models and the ordinary filter sieves of different models as well as the corresponding acoustic impedances are recorded. The larger the mass of the dirt passing through the dust-proof member is, the worse the dust-proof effect is. The higher the acoustic impedance is, the more serious the sound attenuation is. In FIG. 10, the ordinary filter of model 160, the ordinary filter of model 155, the ordinary filter of model 115, the ordinary filter of model 080, the ordinary filter of model 075, the ordinary filter of model 026, the ordinary filter of model 042, and the ordinary filter of model 032 are arranged according to a curve trend. It can be seen that the larger the mass of the dirt passing through the ordinary filter sieve is, the worse the dust-proof effect is and the lower the acoustic impedance is, and that the smaller the mass of the dirt passing through the ordinary filter sieve is, the better the dust-proof effect is and the higher the acoustic impedance is.

However, the masses of the dirt passing through the inner dust-proof members 240 of model NM153-025F and of model NM153-17F as well as the acoustic impedances thereof are both small. The inner dust-proof member 240 of model NM153-025F includes a dust-proof body 242 and a plurality of dust-proof threads 243. The dust-proof body 242 is provided with a plurality of through holes 244, and the plurality of dust-proof threads 243 are covered on the through holes 244 in an interwoven manner to form the inner filter hole 241. The surface of the dust-proof thread 243 is provided with the oil-proof layer. The inner dust-proof member 240 of model NM153-17F is similar to the inner dust-proof member 240 of model NM153-025F. The difference therebetween is that the surface of the dust-proof thread 243 of the inner dust-proof member 240 of model NM153-17F is provided with the water-proof layer and is not provided with the oil-proof layer. It can be seen that the inner dust-proof member 240 provided in the embodiment of the present disclosure has a good dust-proof effect and a small acoustic impedance.

As illustrated in the combination of FIG. 9 and FIG. 10, the inner dust-proof member 240 provided in the embodiment of the present disclosure has good dust-proof, oil-proof and water-proof performances, and also has a small acoustic impedance for sound transmission and a small impact on the volume of the audio module 220.

In an embodiment, the length of the buffer channel 251 along the sound transmission direction is 0.6 mm, and the aperture size of the outer filter hole 231 of the outer dust-proof member 230 is 85 μm. The inner dust-proof member 240 includes the dust-proof body 242, and the aperture size of the through hole 244 of the dust-proof body 242 is 150 μm. In some embodiments, the above arrangement allows the outer dust-proof member 230 and the inner dust-proof member 240 to be effectively combined, so as to reduce the jammed hole rate, and also to ensure the volume of the intelligent apparatus and the heat dissipation performance of the audio module 220, thus effectively reducing the after-sales problems of the intelligent apparatus.

In the intelligent apparatus provided in the embodiments of the present disclosure, by use of the combination of the outer dust-proof member 230 and the inner dust-proof member 240, the solid particles and the liquid are significantly prevented from jamming the outer filter hole 231 and the inner filter hole 241 after being mixed, thus avoiding effects on the volume and reducing after-sales problems. By means of arranging the buffer member 250 between the outer dust-proof member 230 and the inner dust-proof member 240, the buffer channel 251 of the buffer member 250 provides the buffer space for the small-particle dirt, thus facilitating a decrease of the jammed hole rate of the inner dust-proof member 240. By arranging the water-proof layer and/or the oil-proof layer on the surface of the dust-proof thread 243 of the inner dust-proof member 240, the inner dust-proof member 240 has good water-proof and/or oil-proof effects, so as to avoid the dirt from jamming the inner filter hole 241. In addition, the outer dust-proof member 230 and the inner dust-proof member 240 are easy to be replaced and maintained, thus reducing the maintenance cost.

The above embodiments of the present disclosure may be complementary for each other under the case of no conflict.

The above description is only a preferable embodiment of the present disclosure, which is not construed to limit the present disclosure. Any modification, equivalent replacement, improvement made within the spirit and principle of the present disclosure should be included in the protection scope of the present disclosure.

What is claimed is:

1. An intelligent apparatus, comprising:
   a housing defining a mounting chamber therein and having a sound guide hole that is in communication with the mounting chamber;
   an audio module arranged in the mounting chamber that includes a sound guide channel in communication with the sound guide hole;
   an outer dust-proof member that is arranged between the sound guide hole and the sound guide channel, the outer dust-proof member having an outer filter hole communicating the sound guide hole with the sound guide channel;
   an inner dust-proof member that is arranged between the outer dust-proof member and the sound guide channel, the inner dust-proof member having an inner filter hole communicating the outer filter hole with the sound guide channel, where the outer filter hole has an aperture size that is larger than an aperture size of the inner filter hole; and
   a buffer member defining a buffer channel therein, one end of the buffer channel is in communication with the sound guide hole through the outer dust-proof member and another end of the buffer channel is in communication with the sound guide channel through the inner dust-proof member,
   wherein the buffer member further includes a flexible sealing piece having one end that is communicated with the outer dust-proof member and another end that is communicated with the inner dust-proof member.

2. The intelligent apparatus according to claim 1, wherein at least a part of the other end of the buffer channel in communication with the inner dust-proof member is projected on the outer dust-proof member.

3. The intelligent apparatus according to claim 2, wherein the other end of the buffer channel in communication with the inner dust-proof member is completely projected on the outer dust-proof member.

4. The intelligent apparatus according to claim 1, wherein a length of the buffer channel along a sound transmission direction is in a range of 0.3 mm-2 mm.

5. The intelligent apparatus according to claim 1, wherein an aperture size of the outer filter hole is in a range of 40-300 µm.

6. The intelligent apparatus according to claim 1, wherein the outer dust-proof member is detachably connected with an inner wall of the housing arranged at a periphery of the sound guide hole.

7. The intelligent apparatus according to claim 1, wherein the inner dust-proof member is detachably connected with a part of the audio module arranged at a periphery of the sound guide channel.

8. The intelligent apparatus according to claim 1, wherein:
   the outer dust-proof member is detachably connected with an inner wall of the housing arranged at a periphery of the sound guide hole, and
   the inner dust-proof member is detachably connected with a part of the audio module arranged at a periphery of the sound guide channel.

9. The intelligent apparatus according to claim 1, wherein the outer dust-proof member is bonded to an inner wall of the housing arranged at a periphery of the sound guide hole.

10. The intelligent apparatus according to claim 1, wherein the inner dust-proof member is bonded to a part of the audio module arranged at a periphery of the sound guide channel.

11. The intelligent apparatus according to claim 1, wherein:
    the outer dust-proof member is bonded to an inner wall of the housing arranged at a periphery of the sound guide hole, and
    the inner dust-proof member is bonded to a part of the audio module arranged at a periphery of the sound guide channel.

12. An intelligent apparatus, comprising:
    a housing defining a mounting chamber therein and having a sound guide hole that is in communication with the mounting chamber;
    an audio module arranged in the mounting chamber that includes a sound guide channel in communication with the sound guide hole;
    an outer dust-proof member that is arranged between the sound guide hole and the sound guide channel, the outer dust-proof member having an outer filter hole communicating the sound guide hole with the sound guide channel; and
    an inner dust-proof member that is arranged between the outer dust-proof member and the sound guide channel, the inner dust-proof member having an inner filter hole communicating the outer filter hole with the sound guide channel, where the outer filter hole has an aperture size that is larger than an aperture size of the inner filter hole,
    wherein the inner dust-proof member further includes a dust-proof body and a plurality of dust-proof threads, the dust-proof body is provided with a plurality of through holes and the plurality of dust-proof threads are covered on the through holes in an interwoven manner to form an inner filter hole.

13. The intelligent apparatus according to claim 12, wherein a surface of the dust-proof thread is provided with at least one of a water-proof layer and an oil-proof layer.

14. The intelligent apparatus according to claim 12, wherein an aperture size of the through hole is in a range of 50-300 µm.

15. The intelligent apparatus according to claim 12, wherein a diameter of the dust-proof thread is in a range of 30-50 nm.

16. The intelligent apparatus according to claim 12, wherein:
    an aperture size of the through hole is in a range of 50-300 µm, and
    a diameter of the dust-proof thread is in a range of 30-50 nm.

* * * * *